(12) United States Patent
Numakami

(10) Patent No.: US 8,782,167 B2
(45) Date of Patent: Jul. 15, 2014

(54) TRANSMISSION APPARATUS, TRANSMISSION METHOD, AND TRANSMISSION SYSTEM TO TRANSMIT IDENTIFICATION INFORMATION FOR VIRTUAL DIRECTORY

(75) Inventor: Yukio Numakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/191,272

(22) Filed: Jul. 26, 2011

(65) Prior Publication Data

US 2012/0036221 A1 Feb. 9, 2012

(30) Foreign Application Priority Data

Aug. 3, 2010 (JP) ................................. 2010-174356

(51) Int. Cl.
*G06F 13/00* (2006.01)
(52) U.S. Cl.
USPC ........................................................ 709/217
(58) Field of Classification Search
USPC ........................................................ 709/217
See application file for complete search history.

(56) References Cited

U.S. PATENT DOCUMENTS

2009/0119766 A1* 5/2009 Huetter et al. .................. 726/12

FOREIGN PATENT DOCUMENTS

| JP | 2006-301791 A | 11/2006 |
| JP | 2008-20959 A | 1/2008 |
| JP | 2010-166253 A | 7/2010 |

OTHER PUBLICATIONS

Star Ocean Till the End if Time Official Guide Book Final-Edition, Square Enix, Jun. 20, 2006.

* cited by examiner

*Primary Examiner* — Robert B Harrell
(74) *Attorney, Agent, or Firm* — Canon USA, Inc. IP Division

(57) ABSTRACT

A transmission apparatus is configured to transmit identification information for referring to a content and/or a sub directory included in a directory designated by a receiving apparatus to the receiving apparatus via a network. The transmission apparatus includes a loading unit configured to load a content, a generation unit configured to generate identification information for referring to a new directory for referring to the content loaded by the loading unit so that the new directory is referred to as a sub directory included in the directory designated by the receiving apparatus, an addition unit configured to add the identification information generated by the generation unit to the content information included in the designated directory, and a transmission unit configured to transmit the content information to which the identification information generated by the generation unit has been added by the addition unit to the receiving apparatus.

14 Claims, 13 Drawing Sheets

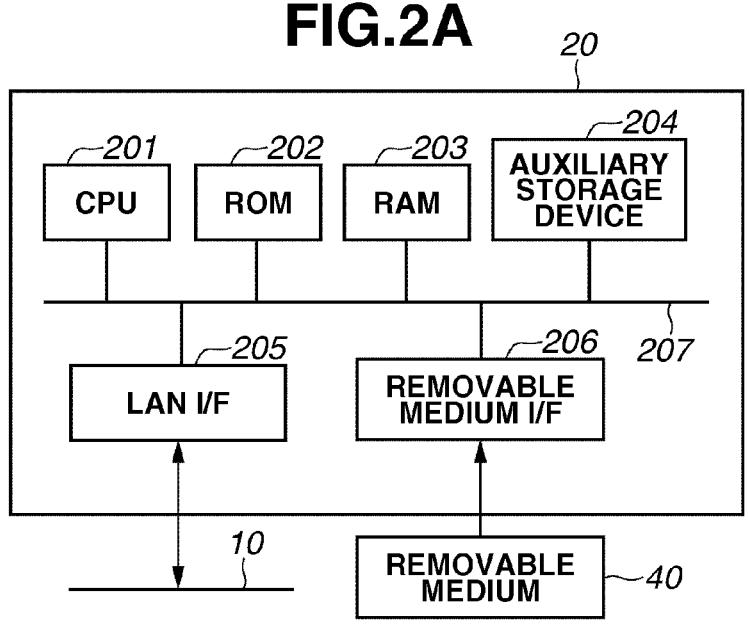
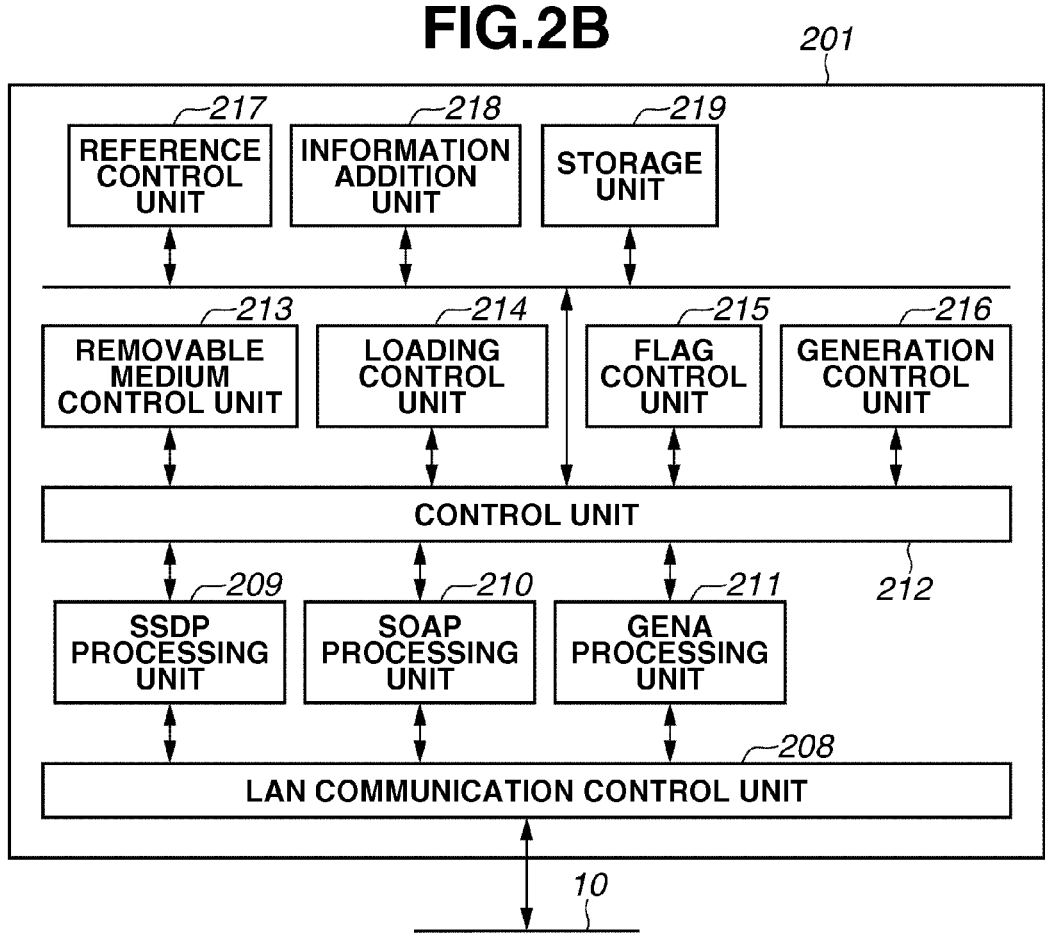

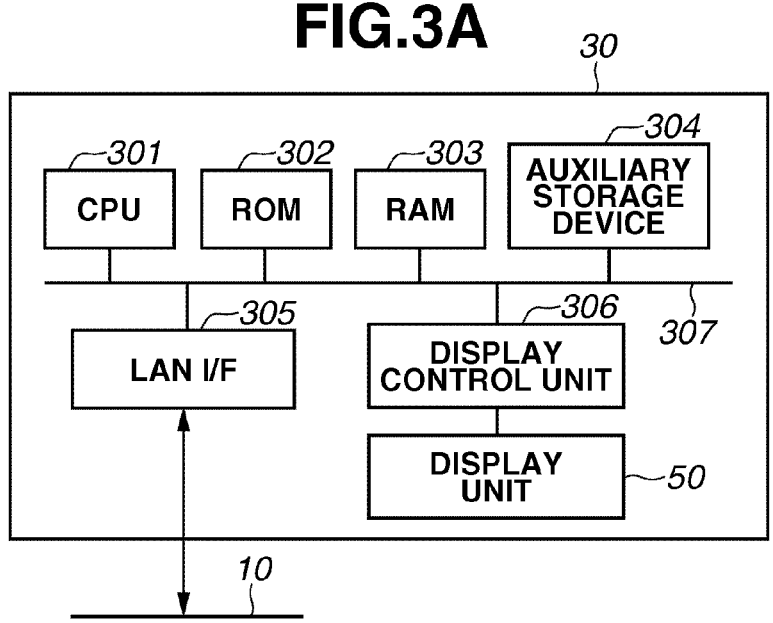

FIG.5

```
<DIDL-Lite xmlns="urn:schemas-upnp-org:metadata-1-0/DIDL-Lite/" xmlns:dc="http://purl.org/dc/e
lements/1.1/" xmlns:upnp="urn:schemas-upnp-org:metadata-1-0/upnpupnp" xmlns:dlna="urn:schemas-
dlna-org:metadata-1-0">
    <container id="0$01" parentID="0" childCount="3">          ─502
        <dc:title>Container_01</dc:title>
        <upnp:class>object.container.storageFolder</upnp:class>
    </container>

<container id="0$02" parentID="0" childCount="3">          ─503
        <dc:title>Container_02</dc:title>
        <upnp:class>object.container.storageFolder</upnp:class>
    </container>

<container id="0$03" parentID="0" childCount="3">          ─504
        <dc:title>Container_03</dc:title>
        <upnp:class>object.container.storageFolder</upnp:class>
    </container>

<container id="0$00" parentID="0" childCount="4">          ─505
        <dc:title>TemporaryContainer</dc:title>
        <upnp:class>object.container.storageFolder</upnp:class>
    </container>
</DIDL-Lite>
```

```
<DIDL-Lite xmlns="urn:schemas-upnp-org:metadata-1-0/DIDL-Lite/" xmlns:dc="http://purl.org/dc/e
lements/1.1/" xmlns:upnp="urn:schemas-upnp-org:metadata-1-0/upnpupnp" xmlns:dlna="urn:schemas-
dlna-org:metadata-1-0">

<item id="0$00$013" parentID="0S00" refID="0$01$013">
       <dc:title>NewItem_013</dc:title>
       <upnp:class>object.item.imageItem.Photo</upnp:class>
       ...
    </item>                                                              ~602

<item id="0$00$023" parentID="0S00" refID="0$02$023">
       <dc:title>NewItem_023</dc:title>
       <upnp:class>object.item.imageItem.Photo</upnp:class>
       ...
    </item>                                                              ~603

<item id="0$00$032" parentID="0S00" refID="0$03$032">
       <dc:title>NewItem_032</dc:title>
       <upnp:class>object.item.imageItem.Photo</upnp:class>
       ...
    </item>                                                              ~604

<item id="0$00$033" parentID="0S00" refID="0$03$033">
       <dc:title>NewItem_033</dc:title>
       <upnp:class>object.item.imageItem.Photo</upnp:class>
       ...
    </item>                                                              ~605

</DIDL-Lite>
```

601

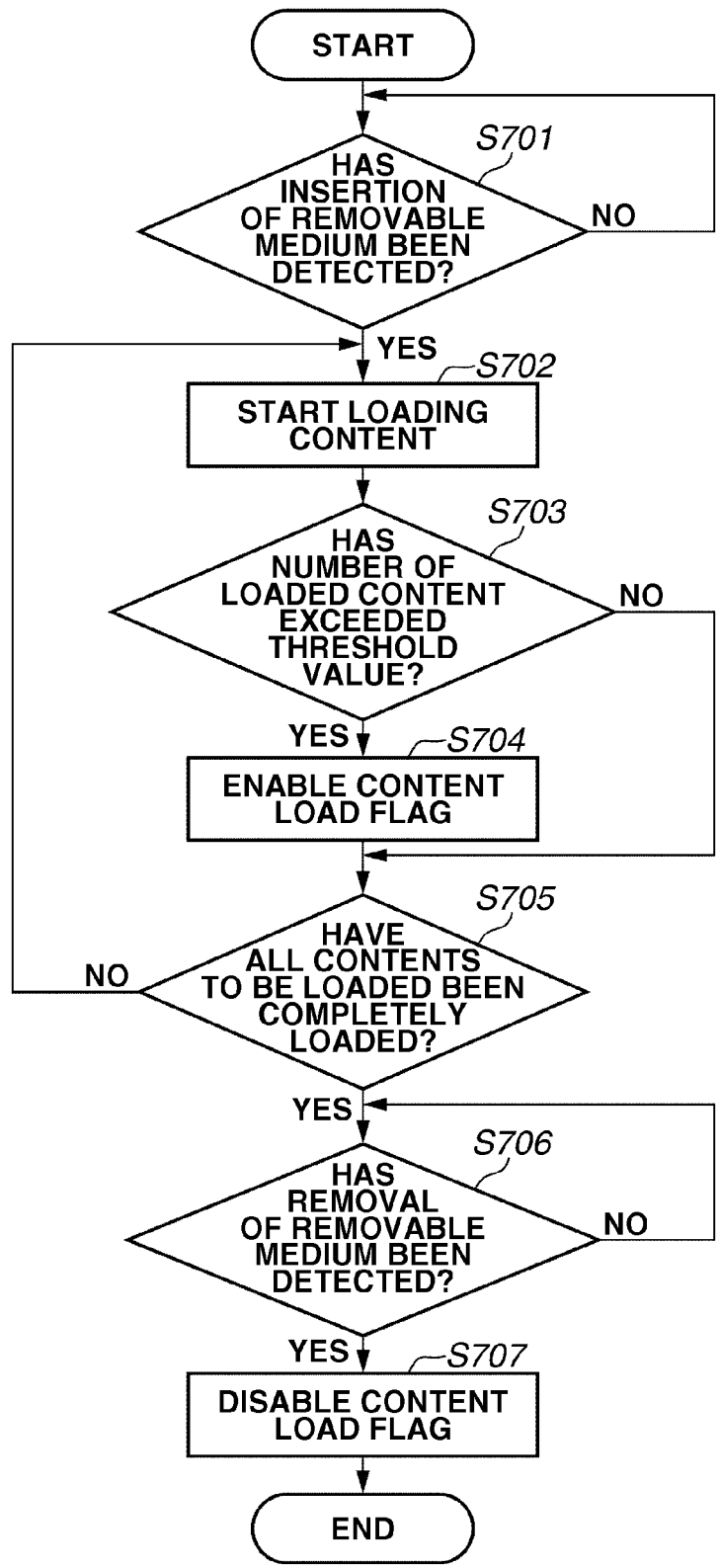

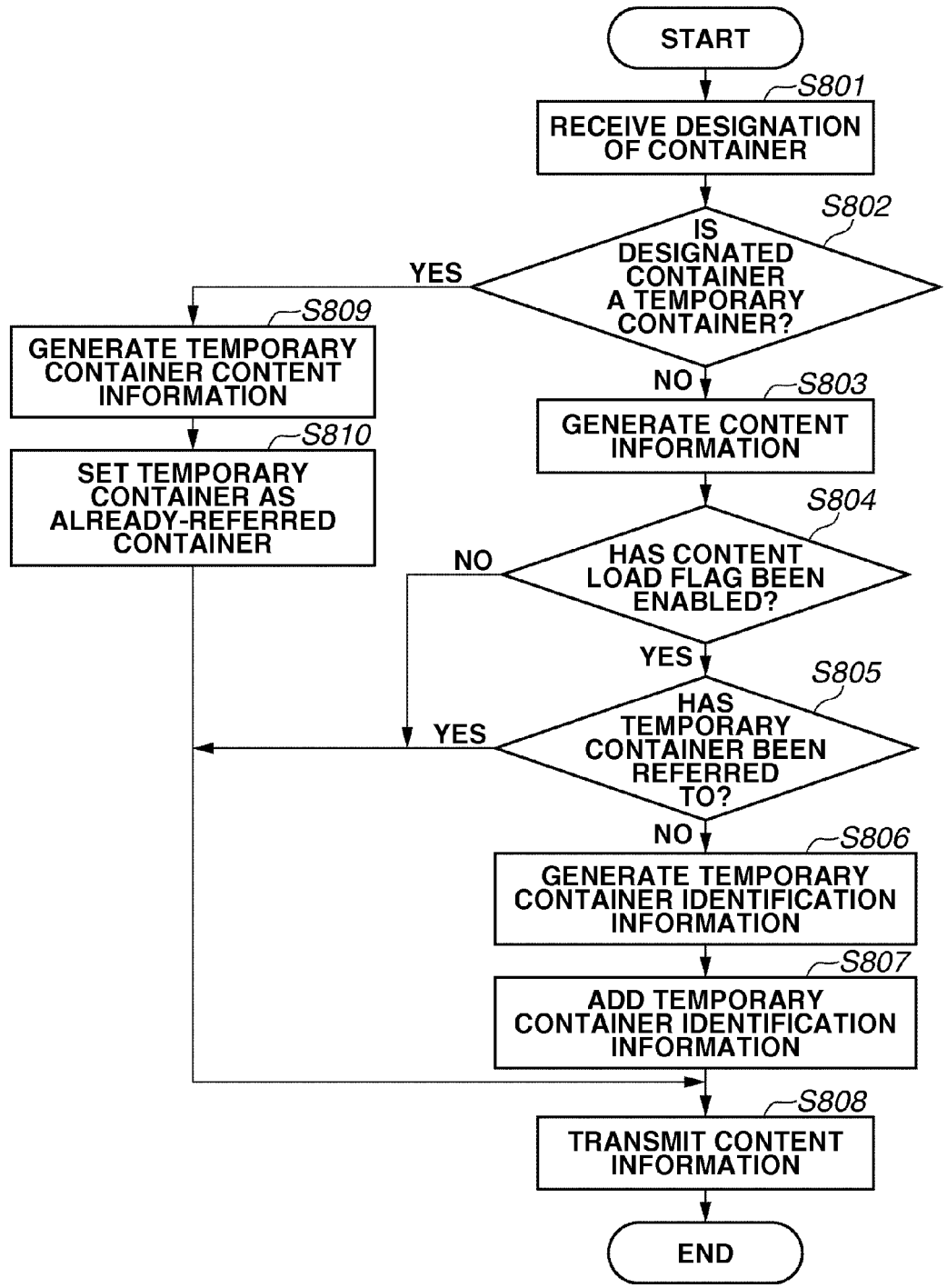

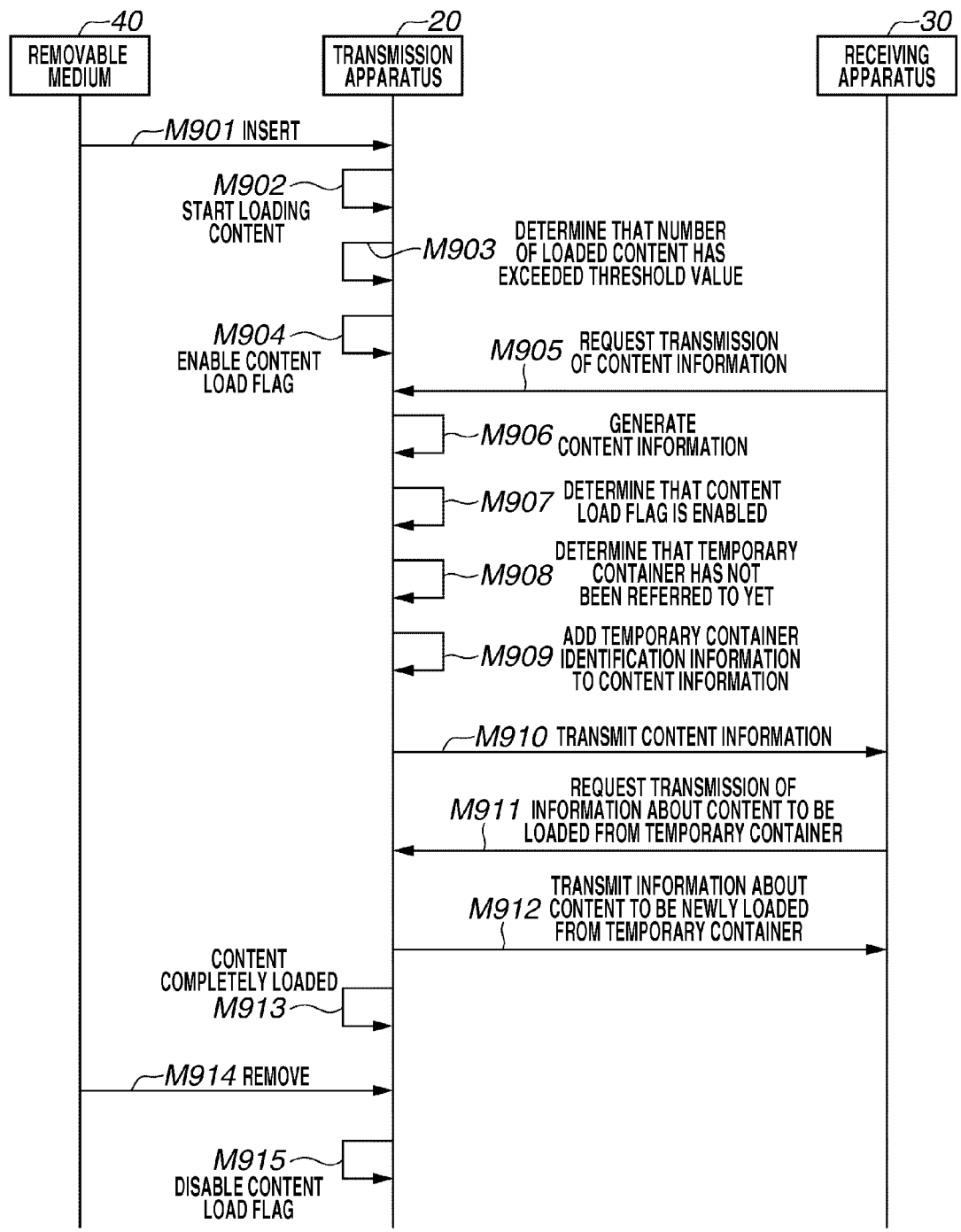

TRANSMISSION APPARATUS, TRANSMISSION METHOD, AND TRANSMISSION SYSTEM TO TRANSMIT IDENTIFICATION INFORMATION FOR VIRTUAL DIRECTORY

BACKGROUND OF THE INVENTION

1. Field of the Invention

Embodiments of the present invention relate to a transmission technique to transmit a content to a receiving apparatus connected to a network.

2. Description of the Related Art

A conventional content transmission system has been used, such as Universal Plug and Play (UPnP) (trademark), which is a transmission system configured to mutually connect apparatuses via a network and to transmit a content, such as a still image, a moving image, or audio information. In addition, a conventional content transmission system, such as Digital Living Network Alliance (DLNA) (trade mark), which is regulated based on UPnP (trade mark), has been used.

In the content transmission system described above, a transmission apparatus transmits a content and metadata of the content to a receiving apparatus, such as the content reproduction apparatus. The transmission apparatus can load a new content from a device or an apparatus external to the transmission apparatus via a memory card or via a network.

The transmission apparatus stores the newly loaded content in a predetermined directory within a logical file system managed by the transmission apparatus. Alternatively, as discussed by Japanese Patent Application Publication No. 2008-20959, the transmission apparatus stores the content loaded into a temporary directory for temporarily registering a content or metadata of the content.

In addition, the transmission apparatus notifies the receiving apparatus what type of structure of the logical file system in which the content is stored within the transmission apparatus. More specifically, in the standard by the above-described DLNA (trade mark), a directory, which stores a content, has a hierarchical structure and is stored on the transmission apparatus. The transmission apparatus notifies the receiving apparatus of the hierarchical structure.

Furthermore, the reproduction apparatus acquires the content and information about the hierarchical structure of the directory from the transmission apparatus. In addition, the reproduction apparatus presents the content and the layers of the directory to the user. The user follows the presented layer and selects a desired content.

After loading a new content and updating the content managed by the transmission apparatus, the transmission apparatus notifies the receiving apparatus that the content has been updated as discussed by Japanese Patent Application Publication No. 2010-166253. However, in the conventional method, the receiving apparatus presents the new content included in each directory to the user. Accordingly, the user may not know that a content has been newly loaded by the transmission apparatus and added into a directory other than a currently browsed directory.

SUMMARY OF THE INVENTION

One disclosed aspect of the embodiments is directed to a technique for allowing the user to easily recognize the presence of a content newly loaded onto a transmission apparatus.

According to an aspect of the embodiments, a transmission apparatus is configured to transmit identification information for referring to a content and/or a sub directory included in a directory designated by a receiving apparatus to the receiving apparatus via a network. The transmission apparatus includes a loading unit configured to load a content, a generation unit configured to generate identification information for referring to a new directory for referring to the content loaded by the loading unit so that the new directory may be referred to as a sub directory included in the directory designated by the receiving apparatus, an addition unit configured, to add the identification information generated by the generation unit to the content information included in the designated directory, and a transmission unit configured to transmit the content information to which the identification information generated by the generation unit has been added by the addition unit to the receiving apparatus.

According to one disclosed aspect of the embodiments, if the user is currently browsing an arbitrary directory of a receiving apparatus, the user is allowed to recognize the presence of a content that has been newly loaded onto a transmission apparatus. Accordingly, the user convenience may be improved.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute apart of the specification, illustrate features, and aspects of the exemplary embodiments, and, together with the description, serve to explain the principles of the present invention.

FIGS. 2A and 2B are block diagrams illustrating an exemplary configuration of a transmission apparatus.

FIGS. 3A and 3B are block diagrams illustrating an exemplary configuration of a receiving apparatus.

FIG. 5 illustrates an exemplary structure of content information that is transmitted by the transmission apparatus.

FIG. 6 illustrates an exemplary structure of content information that is transmitted by the transmission apparatus.

FIG. 7 is a flow chart illustrating an exemplary flow of an operation executed by the transmission apparatus for loading a new content.

FIG. 8 is a flow chart illustrating an exemplary flow of an operation executed by the transmission apparatus for transmitting the content information.

FIG. 9 is a sequence chart illustrating an example of processing for generating a message displayed when the content information is transmitted by the transmission apparatus.

DESCRIPTION OF THE EMBODIMENTS

Figure 1:
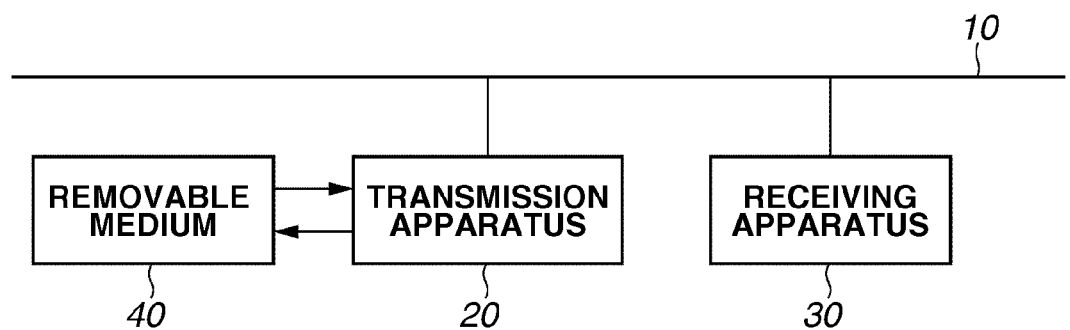
FIG. 1 illustrates an exemplary configuration of a content transmission system.

Various exemplary embodiments, features, and aspects of the invention will be described in detail below with reference to the drawings.

One disclosed feature of the embodiments may be described as a process which is usually depicted as a flowchart, a flow diagram, a structure diagram, or a block diagram. Although a flowchart may describe the operations as a sequential process, the operations may be performed in parallel or concurrently. In addition, the order of the operations may be re-arranged. A process is terminated when its operations are completed. A process may correspond to a method, a program, a procedure, a method of manufacturing or fabrication, a sequence of operations performed by an apparatus, a machine, or a logic circuit, etc.

Now, a first exemplary embodiment of the present invention will be described below with reference to the drawings. In the present exemplary embodiment, it is supposed that DLNA (trade mark) is used as a content transmission system.

DLNA (trade mark) regulates a transmission apparatus, such as a digital media server (DMS). The DMS is a transmission apparatus that transmits a content. A personal computer (PC) or a network attached storage (NAS) serve as the DMS. The DMS transmits content information to a digital media player (DMP) or a digital media controller (DMC).

The content information is information including identification information for referring to a content included in a directory (hereinafter simply referred to as a "container") designated by a receiving apparatus, such as a DMP or a DMC and/or identification information for referring to a sub directory (hereinafter simply referred to as a "sub container") included in the designated container.

The identification information for referring to a content is metadata of a content and is information necessary for referring to a content from the designated container. More specifically, the identification information for referring to a content includes an identifier, an attribute (image, audio, or document), and a title, an identifier of a parent container including the content, reference content information (hereinafter simply referred to as a "shortcut") if the content is reference content information, and information about a destination of the link (uniform resource locator (URL)).

In addition, the identification information for referring to a sub container is metadata of the sub container and is information necessary for referring to the sub container from the designated container. More specifically, the data for referring to the sub container includes container information, such as an identifier of the container, an attribute of the container, a title of the container, an identifier of the parent directory of the container, and the number of the containers and the number of contents included in the container. The content information and the identification information will be described in detail below with reference to FIGS. 5 and 6.

The DMS can externally load a new content via a removable medium, such as the memory card, and via a network. The DMS stores the loaded new content and the metadata thereof into a predetermined container. In addition, according to the designation of the predetermined container executed from the DMP and the DMC, the DMS transmits the content information stored in the designated container to the DMP and the DMC.

The DMS transmits the content information to the DMP and the DMC in Digital Item Description Language-Lite (DIDL-Lite) format. A receiving apparatus, such as the DMP and the DMC, receives the content information in the designated container from the DMS and displays an icon for referring to the content included in the container and/or an icon for referring to the sub container included in the designated container.

In the present exemplary embodiment, the DMP is a reproduction apparatus configured to search the DMS for a content and plays back the content. As the DMP, a television set, an audio system, a home theater system, a wireless monitor, and a home gaming machine can be used.

The DMC is a controller configured to search the DMS for a content and execute control for transmitting the content to a digital media renderer (DMR) and for rendering the transmitted content by the DMR. As the DMC, an Internet tablet, a Wireless Fidelity (WiFi) (trade mark)-compliant digital camera, and a personal digital assistant (PDA) can be used.

The DMR is a rendering apparatus configured to search the DMS for a content using the DMC and to render the content transmitted from the DMS. As the DMS, a television set, an audio/video receiver, a video monitor, and an audio remote speaker can be used.

FIG. 1 illustrates an exemplary configuration of a content transmission system according to the present exemplary embodiment. Referring to FIG. 1, a local area network (LAN) 10 is a wired LAN or a wireless LAN, which is the network according to the present exemplary embodiment. In the present exemplary embodiment, a wired or wireless LAN is used as the network. However, the present exemplary embodiment is not limited to this. More specifically, a wide area network (WAN), an ad hoc network, Bluetooth (trade mark), Zigbee (trade mark), or ultra wide band (UWB) can be used.

A transmission apparatus 20 transmits the content information in response to a content information transmission request input by a receiving apparatus 30. The transmission apparatus 20 according to the present exemplary embodiment transmits the content information, to which identification information about a temporary directory (hereinafter simply referred to as a "temporary container") for referring to a content newly loaded from a removable medium 40 has been added, to the receiving apparatus 30 on the LAN 10.

In the present exemplary embodiment, the transmission apparatus 20 functions as the DMS in the DLNA. More specifically, for the transmission apparatus 20, a terminal including a communication function for communicating with other apparatuses via a network, such as a home server apparatus, a NAS apparatus, a camera apparatus, a video camera apparatus, a PC apparatus, or a cellular phone can be used. In addition, the transmission apparatus 20 can be implemented by any combination of the terminals.

The transmission apparatus 20 includes a content directory service (CDS). The CDS refers to a function for notifying a receiving apparatus, such as a reproduction apparatus connected to a network, of a layered list of contents and information stored on the transmission apparatus 20. In the present exemplary embodiment, an apparatus having the function of the DMS included in DLNA is used as the transmission apparatus. However, the present exemplary embodiment is not limited to this. More specifically, any apparatus having a function for transmitting the content information within a network can be used.

The receiving apparatus 30 acquires the content and the content information transmitted by the transmission apparatus 20 provided on the LAN 10. For a specific example of the receiving apparatus 30, a DMP and a DMC can be used. In the present exemplary embodiment, the DMP or the DMC is used as the receiving apparatus 30. However, alternatively, any apparatus having a function for acquiring a content and metadata of the content within the network can be used as the receiving apparatus 30.

The removable medium 40 is connected to the transmission apparatus 20 according to the present exemplary embodiment. A plurality of contents stored on the removable medium 40 is transmitted to the transmission apparatus 20. For the removable medium 40, a universal serial bus (USB) memory, a secure digital (SD) memory card, or a multi media card (MMC) may be used.

More specifically, any device from which the transmission apparatus 20 may acquire a content may be used as the removable medium 40. For example, a server apparatus on a home network or the Internet, an apparatus having a proximity wireless communication function, such as an integrated circuit (IC) card, or an optical disc may be used as the removable medium 40.

FIG. 2A is a block diagram illustrating an exemplary configuration of the transmission apparatus 20 according to the present exemplary embodiment. The central processing unit (CPU) 201 executes a program stored on a read-only memory (ROM) 202, which will be described later below, and a random access memory (RAM) 203 to control the operation of the entire transmission apparatus 20.

The ROM 202 stores a program and a parameter not to be changed. The RAM 203 temporarily stores a program and data supplied by an external apparatus. The program stored on the ROM 202 and the RAM 203 will be described later below.

An auxiliary storage device 204 stores a content loaded from the removable medium 40 and metadata of the content. The auxiliary storage device 204 is a hard disk or a memory card fixedly mounted on the transmission apparatus 20. In addition, for the auxiliary storage device 204, a flexible disk (FD) that may be detachably mounted to the transmission apparatus 20, an optical disk, such as a compact disc (CD), a magnetic card, an optic card, a magneto-optic card, an IC card, or a memory card may be used.

The LAN interface (I/F) 205 controls a communication executed by the transmission apparatus 20 via the LAN 10. A removable medium I/F 206 includes a connection unit for connecting the removable medium 40. The removable medium I/F 206 controls an access to the removable medium 40. A system bus 207 connects each unit from 201 to 206 to be capable of communicating each other.

Now, an exemplary module configuration of the program executed by the CPU 201 will be described below with reference to FIG. 2B. The program constituted by the modules illustrated in FIG. 2B is stored on the ROM 202.

A LAN communication control unit 208 is configured to instruct the LAN I/F 205 to execute a communication control for connecting the transmission apparatus 20 to the LAN 10. A Simple Service Discovery Protocol (SSDP) processing unit 209 is configured to receive a corresponding packet, which has been acquired via the LAN I/F 205 according to the instruction input via the LAN communication control unit 208. Furthermore, the SSDP processing unit 209 executes SSDP processing of UPnP (trade mark).

The SSDP processing unit 209 notifies other DLNA apparatuses on the LAN 10 including the receiving apparatus 30 that the transmission apparatus 20 exists on the LAN 10 as a DMS. This notification is referred to as an "alive message" in SSDP. In addition, the SSDP processing unit 209 finds other UPnP services on the LAN 10 or replies if any other DLNA (trade mark) apparatus has found a UPnP service.

The present exemplary embodiment utilizes the SSDP processing. However, the present exemplary embodiment is not limited to this. More specifically, a method different from the above-described method, such as Web services Dynamic Discovery (WS-Discovery) or the media access control (MAC) address may be utilized. Simple Object Access Protocol (SOAP) processing unit 210 receives a corresponding packet, which has been acquired via the LAN I/F 205 according to an instruction input via the LAN communication control unit 208 and executes SOAP processing of UPnP.

The SOAP processing unit 210 issues a request to another UPnP service or receives and replies to a UPnP service request input by another DLNA apparatus. In particular, the SOAP processing unit 210 receives a designation of a container from the receiving apparatus 30 on the LAN 10. In addition, the SOAP processing unit 210 transmits a reply to the designation of the container to the receiving apparatus 30.

In the present exemplary embodiment, the SOAP processing is utilized. However, the present exemplary embodiment is not limited to this. More specifically, a different other method for executing a remote object, such as remote procedure call, may be used.

A General Event Notification Architecture (GENA) processing unit 211 receives a corresponding packet, which has been acquired via the LAN I/F 205 according to an instruction input via the LAN communication control unit 208 and executes GENA processing of UPnP based on the received packet. Furthermore, the GENA processing unit 211 adds an event to another DLNA apparatus on the LAN 10 or subscribes a UPnP service event that another DLNA apparatus has.

In the present exemplary embodiment, the GENA processing is utilized. However, the present exemplary embodiment is not limited to this. More specifically, any other different method, such as Web Services Eventing (WS-Eventing) or Web Services Notification (WS-Notification), may be utilized.

A control unit 212 controls the entire transmission apparatus 20. More specifically, the control unit 212 manages and controls each module from the LAN communication control unit 208 to a storage unit 219.

The removable medium control unit 213 controls a data access to a logical file system of the removable medium 40 via the removable medium I/F 206.

In addition, the removable medium control unit 213 acquires a list of data files of the content and reads and writes the data file of the content via the removable medium I/F 206. Furthermore, if the removable medium 40 has been inserted to or removed from the removable medium I/F 206, the removable medium control unit 213 detects the insertion or removal of the removable medium 40.

After acquiring the list of contents included in the removable medium 40 via the removable medium control unit 213, the loading control unit 214 determines a content to be newly loaded according to the content list. In addition, the loading control unit 214 starts processing for loading the determined new content and loads the new content as a target to be loaded from the removable medium 40 via the removable medium control unit 213.

The new content loaded by the loading control unit 214 is stored by the storage unit 219, which will be described below, in a storage area of the auxiliary storage device 204. When the new content as a target to be loaded is completely loaded, the loading control unit 214 ends the processing.

When the loading control unit 214 starts loading the new content, the flag control unit 215 enables a content load flag, which is managed on the RAM 203. On the other hand, when the loading control unit 214 ends the new content loading processing, the flag control unit 215 disables the content load flag.

The generation unit 216 generates DIDL-Lite format content information according to the container designation from the receiving apparatus 30, which has been received by the SOAP processing unit 210. In addition, the generation unit 216 generates identification information for referring to the designated container and a temporary container to enable the reference of the temporary container as a sub container included in the container designated by the receiving apparatus 30.

In the present exemplary embodiment, a "temporary container" refers to as a container for referring to the content loaded by the loading control unit 214. The temporary container is displayed as a new container for storing a file for referring to a new content on the receiving apparatus 30.

Furthermore, in the present exemplary embodiment, the temporary container is a virtual container displayed on the receiving apparatus 30 according to the identification information. However, the present exemplary embodiment is not limited to this. More specifically, a temporary container for storing a new content may be actually generated on the transmission apparatus 20.

In addition, in the present exemplary embodiment, the content information of DIDL-Lite format is utilized. However, alternatively, the content information may have a different format, such as Atom Syndication Format.

The reference control unit 217 determines whether a target of container designation from the receiving apparatus 30 is a temporary container. If a temporary container has been designated, the reference control unit 217 requests the generation unit 216 to generate identification information for referring to the loaded new content. In addition, the reference control unit 217 sets the temporary container as having been referred to.

The information addition unit 218 adds the identification information generated by the generation unit 216 to the content information about a content in the directory designated from the receiving apparatus 30. The storage unit 219 stores the new content, which has been loaded by the loading control unit 214, in a storage area of the auxiliary storage device 204 of the transmission apparatus 20 illustrated in FIG. 2A.

FIG. 3A is a block diagram illustrating an exemplary configuration of the receiving apparatus 30 according to the present exemplary embodiment. A CPU 301 executes a program stored on a ROM 302 and a RAM 303 and controls the entire receiving apparatus 30.

The ROM 302 stores a program and a parameter that do not need to be changed. The RAM 303 temporarily stores a program and data supplied by an external apparatus.

An auxiliary storage device 304 stores identification information for referring to the content loaded from the transmission apparatus 20. A hard disk or a memory card fixedly installed on the receiving apparatus 30 may be used as the auxiliary storage device 304. In addition, for the auxiliary storage device 304, a medium that may be detachably mounted to the receiving apparatus 30 may be used, such as a flexible disk (FD), an optical disk, such as a compact disc (CD), a magnetic card, an optical card, an IC card, or a memory card may be used.

A display control unit 306 outputs an image to be displayed on the display unit 50 and controls the display of the image executed by the display unit 50. A LAN I/F 305 controls communication so that the receiving apparatus 30 connects to the LAN 10. The display unit 50 displays an image received from the display control unit 306. The display unit 50 may be configured as a display apparatus different from the receiving apparatus 30.

FIG. 3B illustrates an exemplary module configuration of a program executed by the CPU 301. The program constituted by the modules illustrated in FIG. 3B is stored on the ROM 302.

An SSDP processing unit 309 finds other UPnP services on the LAN 10 or replies if any other DLNA (trade mark) apparatus has found a UPnP service. The present exemplary embodiment utilizes the SSDP processing. However, the present exemplary embodiment is not limited to this. More specifically, a method different from the above-described method, such as WS-Discovery or the MAC address may be utilized.

A SOAP processing unit 310 issues a request to another UPnP service. In particular, the SOAP processing unit 310 designates a container to the transmission apparatus 20 on the LAN 10. In addition, the SOAP processing unit 310 receives a reply to the designation of the container from the transmission apparatus 20.

In the present exemplary embodiment, the SOAP processing is utilized. However, the present exemplary embodiment is not limited to this. More specifically, a different other method for executing a remote object, such as remote procedure call, may be used.

A GENA processing unit 311 subscribes a UPnP service event that another DLNA apparatus has. In the present exemplary embodiment, the GENA processing unit 311 is utilized. However, the present exemplary embodiment is not limited to this. More specifically, any other different method, such as WS-Eventing or WS-Notification, may be utilized.

A control unit 312 controls the entire receiving apparatus 30. The control unit 312 manages and controls modules a LAN communication unit 308 through a storage unit 318.

A designation unit 313 transmits a container designation or a content designation to the transmission apparatus 20. More specifically, the designation unit 313 transmits a Browse action of the CDS to the transmission apparatus 20.

An acquisition unit 314 acquires the content information included in the designated container from the transmission apparatus 20 as a reply to the container designation. An image generation unit 315 generates a content information browse image according to the content information acquired from the transmission apparatus 20.

In the present exemplary embodiment, a "content information browse image" refers to an image displayed by the display unit 50 as an icon for referring to a content included in the container designated by the receiving apparatus 30 or an icon for a sub container included in the designated container. In addition, the image generation unit 315 displays the generated content information browse image on the display unit 50 via a display control unit 306.

A selection control unit 317 determines whether the user has selected a content in the image. A storage unit 318 stores the content information acquired by the acquisition unit 314 in the storage area of the auxiliary storage device 304 of the receiving apparatus 30 illustrated in FIG. 3A.

Figure 4A:
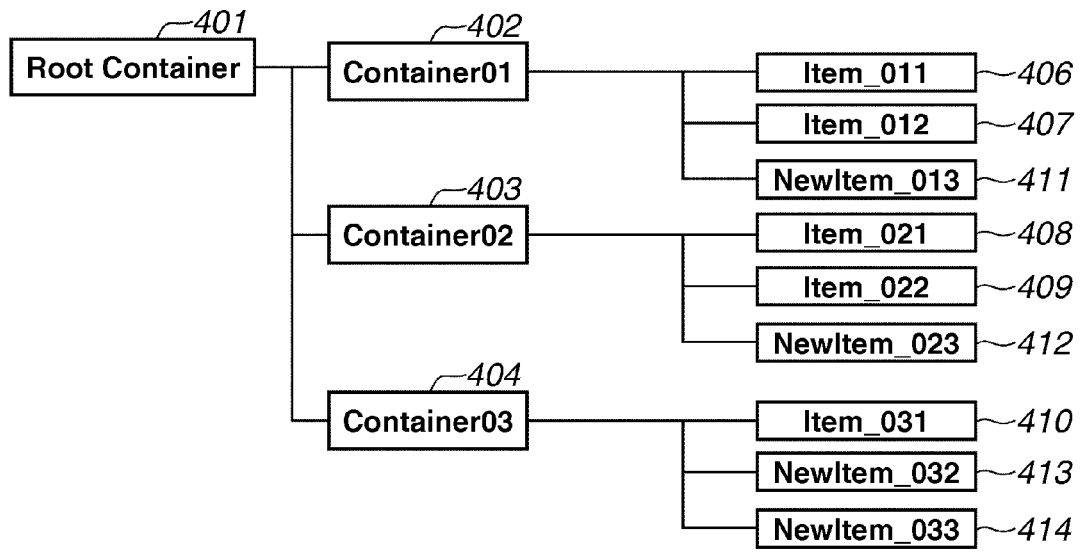
FIGS. 4A and 4B illustrate an example of a logical layer of a container and a content in the content transmission system.

FIG. 4A illustrates an example of a logical layer of a container and a content managed by the transmission apparatus 20 according to the present exemplary embodiment.

A root container 401 indicates a root of the entire logical layer of the container managed by the transmission apparatus 20. Containers 402 through 404 are included in the root container. Contents 406 and 407 are included in the container 402. The contents 406 and 407 include an "Item_011" and an "Item_012", respectively.

A new content 411 is a "NewItem_013", which is a new content newly loaded from the removable medium 40 to the transmission apparatus 20 and stored in the container 402. Contents 408 and 409 are contents that have been already included in the container 403. In other words, the contents 408 and 409 are contents "Item_021" and "Item_022".

A new content 412 is a "NewItem_023", which is a new content newly loaded from the removable medium 40 to the transmission apparatus 20 and stored in the container 403. A content 410 is a content "Item_031", which has been already included in the container 404.

In addition, new contents 413 and 414 are new contents "NewItem_032" and "NewItem_033", which are newly loaded from the removable medium 40 to the transmission apparatus 20 and stored in the container 404.

Figure 4B:
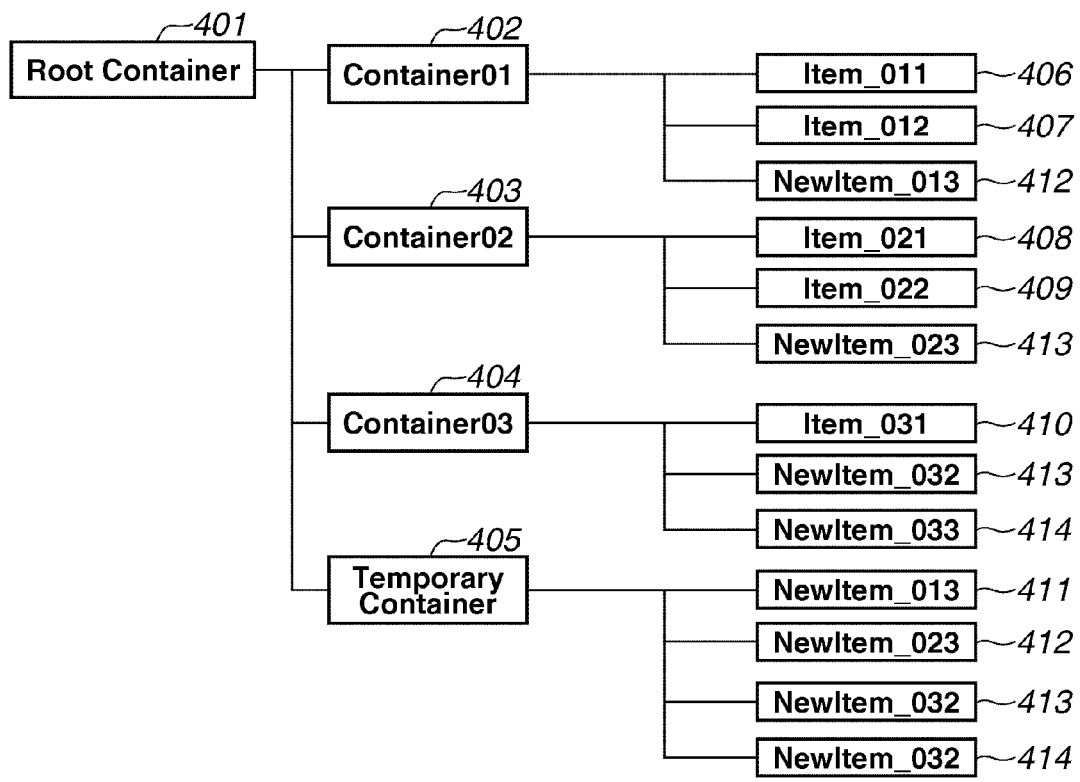

FIG. 4B illustrates an example of a logical layer of a container and a content, which is presented to the user based on content information about a root container received by the receiving apparatus 30 according to the present exemplary embodiment. In the example illustrated in FIG. 4B, containers 402 through 404 and contents included therein are the same as those described above. Accordingly, the description thereof will not be repeated here.

The receiving apparatus 30 may refer to a temporary container 405 as a sub container included in the root container 401 in addition to the containers 402 through 404. New contents 411 through 414, which have been loaded from the removable medium I/F 206 of the transmission apparatus 20, may be referred to from the temporary container.

Now, an exemplary structure of the content information transmitted from the transmission apparatus 20 to the receiving apparatus 30 according to the present exemplary embodiment will be described below with reference to FIG. 5. FIG. 5 illustrates an example of content information about the root container 401.

n DIDL-Lite element 501 indicates the entire content information. The DIDL-Lite element 501 includes identification information for referring to a sub container included in the root container 401. Container elements 502 through 504 illustrate identification information about the containers 402 through 404 illustrated in FIG. 4B, respectively.

In the example illustrated in FIG. 5B, an id attribute described in the container elements 502 through 504 is an identifier of each container. A parentID attribute included in the container elements 502 through 504 is an identifier of a parent container of each container.

In the present exemplary embodiment, a parent container of a specific container A is a container of an order higher than the container A by one layer in the container hierarchical structure illustrated in FIG. 4B. In other words, the parent container includes the container A. For example, the parent container of the containers 402 through 404 is the root container 401. In the example illustrated in FIG. 5, the identifier of the parent container of the containers 402 through 404 is "0", which is the identifier of the root container 401.

A childCount attribute described in the container elements 502 through 504 indicates the number of the containers and the contents included in each container. A container element 505 illustrates the temporary container 405 illustrated in FIG. 4B. The childCount attribute has a value "4", which indicates that four contents or containers from the temporary container 405 may be referred to. In other words, the value of a childCount attribute indicates the total number of contents included in the new contents 411 through 414.

FIG. 6 illustrates an example of a structure of content information including identification information for referring to the content included in the temporary container 405, which is transmitted from the transmission apparatus 20 to the receiving apparatus 30 according to the present exemplary embodiment.

DIDL-Lite element 601 indicates the entire content information about the content included in the temporary container 405. The DIDL-Lite element 601 includes identification information for referring to the content included in the temporary container 405.

Item elements 602 through 605 describes the identification information of the new contents 411 through 414 illustrated in FIGS. 4A and 4B, respectively. An id attribute described in the item elements 602 through 605 is an identifier of each content. A parent ID attribute described in the item elements 602 through 605 is an identifier which indicates a parent container of each content.

The parent container of the new contents 411, new contents 412, new contents 413, and new contents 414 is the temporary container 405. A refID attribute described in the item elements 602 through 605 is an identifier of an item element, which is the entity of a content. If a refID attribute exists in the description, it is indicated that the item elements 602 through 605 are shortcuts.

Now, an exemplary operation executed by the transmission apparatus 20 for loading a new content from the removable medium 40 will be described below with reference to FIG. 7. In the present exemplary embodiment, a program of the operation illustrated in FIG. 7 is stored on the ROM 202 of the transmission apparatus 20 and is executed by the CPU 201. However, alternatively, the processing illustrated in FIG. 7 may be implemented by hardware.

In operation S701, the transmission apparatus 20 determines whether it is detected that the removable medium 40 has been inserted to the removable medium I/F 206. If the transmission apparatus 20 detected that the removable medium 40 has been inserted (Yes in operation S701), then the processing advances to operation S702. On the other hand, if the transmission apparatus 20 did not detect that the removable medium 40 has been inserted (No in operation S701), then the processing advances to operation S701. The processing in operation S701 is executed by the removable medium control unit 213 illustrated in FIG. 2B.

In operation S702, the transmission apparatus 20 acquires the content list from the logical file system of the removable medium 40. More specifically, the removable medium control unit 213 acquires the content list. In addition, the transmission apparatus 20 compares the acquired content list with the content that has been stored on the storage unit 219 to determine a content to be newly loaded.

For example, if the list of contents in the removable medium 40 has been layered in correspondence with the logical layer of the contents stored on the storage unit 219 of the transmission apparatus 20, the transmission apparatus 20 compares the contents for each content layer (i.e., for each container).

If the content stored on the removable medium 40 is different from the content stored on the storage unit 219, the transmission apparatus 20 determines to load the content different from the content stored on the storage unit 219. The method executed by the transmission apparatus 20 to load a content is limited neither to the method described above nor to any specific method.

When the loading of the determined new content is started, the transmission apparatus 20 reads the new content to be loaded one by one from the removable medium 40 and stores the read new content on the auxiliary storage device 204. The determination for the content to be loaded and the loading of the new content are executed by the loading control unit 214.

In operation S703, the transmission apparatus 20 determines whether the number of the newly loaded contents has exceeded a predetermined threshold value.

If the transmission apparatus 20 determined that the number of the newly loaded contents has exceeded the predetermined threshold value (Yes in operation S703), then the processing advances to operation S704. On the other hand, if the transmission apparatus 20 did not determine that the number of the newly loaded contents has not exceeded the predetermined threshold value (No in operation S703), then the processing advances to operation S705. The determination as to whether the number of the loaded contents has exceeded the threshold value is executed by the flag control unit 215.

In the present exemplary embodiment, the transmission apparatus 20 determines whether the number of new contents to be loaded has exceeded the predetermined threshold value and determines whether to start adding the identification information for referring to the temporary container. As a result, it is enabled to allow the user who utilizes the receiving apparatus 30 to recognize that the new content exists only when more than the predetermined number of new contents has been loaded. Accordingly, the convenience of the user who utilizes the receiving apparatus 30 may be improved.

In the present exemplary embodiment, the flag control unit 215 determines whether the number of the newly loaded contents has exceeded the predetermined threshold value. However, the present exemplary embodiment is not limited to this. More specifically, assuming that a threshold value is "1", the flag control unit 215 may determine whether the loading control unit 214 has started the content load processing.

In operation S704, the transmission apparatus 20 enables the content load flag. The content load flag is enabled by the flag control unit 215. In operation S705, the transmission apparatus 20 determines whether all the new contents to be loaded have been completely loaded.

If the transmission apparatus 20 determined that all the new contents to be loaded have been completely loaded (Yes in operation S705), then the processing advances to operation S706. On the other hand, if the transmission apparatus 20 did not determine that all the new contents to be loaded have not been completely loaded yet (No in operation S705), then the processing returns to operation S702 and the new content loading processing is continued. The processing in operation S705 is executed by the loading control unit 214.

In operation S706, the transmission apparatus 20 determines whether the removal of the removable medium 40 from the removable medium I/F 206 has been detected. If the transmission apparatus 20 determined that the removable medium 40 has been removed (Yes in operation S706), then the processing advances to operation S707.

On the other hand, if the transmission apparatus 20 determined that the removable medium 40 has not been removed from the removable medium I/F 206 (No in operation S706), then the processing repeats the processing in operation S706. The processing in operation S706 is executed by the removable medium control unit 213.

In operation S707, the transmission apparatus 20 disables the content load flag. The content load flag is disabled by the flag control unit 215.

Now, an exemplary content information transmission operation, which is executed by the transmission apparatus 20 to transmit the content information to the receiving apparatus 30 when the transmission apparatus 20 has received the container designation from the receiving apparatus 30 on the LAN 10, will be described in detail below with reference to FIG. 8. Processing illustrated in the flow chart of FIG. 8 is a program stored on the ROM 202 and executed by the CPU 201. However, alternatively, the processing illustrated in FIG. 8 may be implemented by hardware.

In operation S801, the transmission apparatus 20 receives the container designation from the receiving apparatus 30 on the LAN 10. More specifically, the transmission apparatus 20 receives the Brose action of the CDS from the receiving apparatus 30.

In the present exemplary embodiment, a "Browse action" refers to a command for instructing the transmission of a list of containers or items included in the processing target container. The processing in operation S801 is executed by the SOAP processing unit 210.

In operation S802, the transmission apparatus 20 determines whether the target of the container designation from the receiving apparatus 30 is a temporary container. If it is determined that the target of the container designation from the receiving apparatus 30 is a temporary container (Yes in operation S802), then the processing advances to operation S809. On the other hand, if it is determined that the target of the container designation from the receiving apparatus 30 is not a temporary container (No in operation S802), then the processing advances to operation S803. The processing in operation S802 is executed by the reference control unit 217.

In operation S803, the transmission apparatus 20, for the designated container, generates DIDL-Lite format content information illustrated in FIG. 5 based on the content stored on the storage unit 219. However, the identification information (the container element 505) for referring to the temporary container is not generated at this timing. The generation of the content information is executed by the generation unit 216.

In operation S804, the transmission apparatus 20 determines whether the content load flag has been enabled. If it is determined that the content load flag has been enabled (Yes in operation S804), then the processing advances to operation S805. On the other hand, if it is determined that the content load flag has been disabled (No in operation S804), then the processing advances to operation S808. The processing in operation S804 is executed by the information addition unit 218.

In operation S805, the information addition unit 218 determines whether the temporary container has already been referred to. The determination in operation S805 is executed according to whether the temporary container has been set to have been already referred to, which is determined in the following operation S810.

If it is determined that the current temporary container has already been referred to (Yes in operation S805), then the processing advances to operation S808. On the other hand, if it is determined that the current temporary container has not been referred to yet (No in operation S805), then the processing advances to operation S806.

In operation S806, the transmission apparatus 20 generates identification information for referring to the temporary container. More specifically, the transmission apparatus 20 generates the container element 505 illustrated in FIG. 5. The processing for generating the identification information for referring to the temporary container is executed by the generation unit 216.

In operation S807, the information addition unit 218 adds the identification information for referring to the temporary container generated in operation S806 to the content information generated in operation S803. In operation S808, the transmission apparatus 20 transmits the content information, to which the identification information generated by the generation unit 216 has been added, to the receiving apparatus 30.

More specifically, the SOAP processing unit 210 transmits the content information to which the identification information generated by the generation unit 216 has been added to the receiving apparatus 30 as a reply to the Browse action of the CDS. Then the transmission apparatus 20 ends the content information transmission operation.

On the other hand, if it is determined that the target of the container designation from the receiving apparatus 30 is the current temporary container (Yes in operation S802), then the processing advances to operation S809. In operation S809, the transmission apparatus 20 generates the DIDL-Lite format content information illustrated in FIG. 6. The processing in operation S809 is executed by the generation unit 216 according to an instruction from the reference control unit 217.

In operation S810, the transmission apparatus 20 sets the current temporary container as having been already referred to (i.e., executes a reference completion setting). Then the processing advances to operation S808. The reference completion setting of the temporary container is executed by the reference control unit 217. The reference completion setting is registered on the RAM 203 of the transmission apparatus 20.

In operation S808, the transmission apparatus 20 transmits the content information, to which the identification information generated by the generation unit 216 has been added, to the receiving apparatus 30. Then the transmission apparatus 20 ends the content information transmission operation.

In the above-described manner, if a container different from the temporary container has been designated by the receiving apparatus 30 after more than the predetermined number of contents has been loaded by the loading control unit 214 and before the temporary container is referred to, the information addition unit 218 adds the identification information generated by the generation unit 216 to the content information about the container different from the temporary container.

Alternatively, regardless of whether the temporary container has been referred to, if the receiving apparatus 30 has designated the container during a time period from the loading of more than the predetermined number of contents have been loaded by the loading control unit 214 to the removal of the removable medium 40 from the removable medium I/F 206, the information addition unit 218 may add the identification information generated by the generation unit 216 to the content information included in the designated container.

The timing of executing the processing for adding the identification information generated by the generation unit 216 to the content information included in the designated container is not limited to a timing included in the time period from the loading of more than the predetermined number of contents by the loading control unit 214 to the removal of the removable medium 40.

More specifically, the information addition unit 218 may add the identification information generated by the generation unit 216 to the content information included in the designated container if the container has been designated first by the receiving apparatus 30 after the loading control unit 214 has loaded the content. With the above-described configuration, even after the removable medium 40 has been removed, if the container has been designated by the receiving apparatus 30 after loading the new content, the receiving apparatus 30 may display the temporary container.

In this case, if a plurality of receiving apparatuses 30 exists, information about whether each receiving apparatus has designated a container after the loading control unit 214 has loaded the content may be recorded on the transmission apparatus 20. By referring to the record, the transmission apparatus 20 may determine whether the designated container is the first container designated by the receiving apparatus 30.

Alternatively it is not limited to the first container. More specifically, in this case, the information addition unit 218 may add the identification information generated by the generation unit 216 to the content information for a secondly designated container.

FIG. 9 is a sequence chart illustrating a sequence for transmitting a message used for transmitting the content information from the transmission apparatus 20 according to the present exemplary embodiment to the receiving apparatus 30 on the LAN 10.

In processing M901, the user inserts the removable medium 40 to the transmission apparatus 20. In processing M902, the transmission apparatus 20 starts the loading of the new content from the inserted removable medium 40.

In processing M903, the transmission apparatus 20 determines that the number of the newly loaded contents has exceeded the predetermined threshold value. In processing M904, the transmission apparatus 20 enables the content load flag.

In processing M905, the receiving apparatus 30 transmits the container designation of the container and the content in the root container to the transmission apparatus 20. In addition, the receiving apparatus 30 requests the transmission apparatus 20 to transmit the content information included in the designated container.

In processing M906, the transmission apparatus 20 receives the container designation from the receiving apparatus 30. The transmission apparatus 20 generates the content information included in the designated container by the generation unit 216.

In processing M907, the transmission apparatus 20 determines that the content load flag has been enabled. In processing M908, the transmission apparatus 20 determines that the current temporary container has not been referred to yet.

In processing M909, the transmission apparatus 20 generates identification information for referring to the current temporary container. In addition, the transmission apparatus 20 adds the generated identification information for referring to the current temporary container to the content information included in the designated container.

In processing M910, the transmission apparatus 20 transmits the content information, to which the identification information for referring to the temporary container has been added, to the receiving apparatus 30. In processing M911, the receiving apparatus 30 transmits the content designation for designating the content referred to from the temporary container to the transmission apparatus 20.

In processing M912, the transmission apparatus 20 generates content information about the temporary container according to the new content referred to from the current temporary container. In addition, the transmission apparatus 20 transmits the generated content information to the receiving apparatus 30.

In processing M913, the transmission apparatus 20 completes the loading of the new content from the inserted removable medium 40. In processing M914, the user removes the removable medium 40 from the transmission apparatus 20. In processing M915, the transmission apparatus 20 disables the content load flag.

Figure 10:
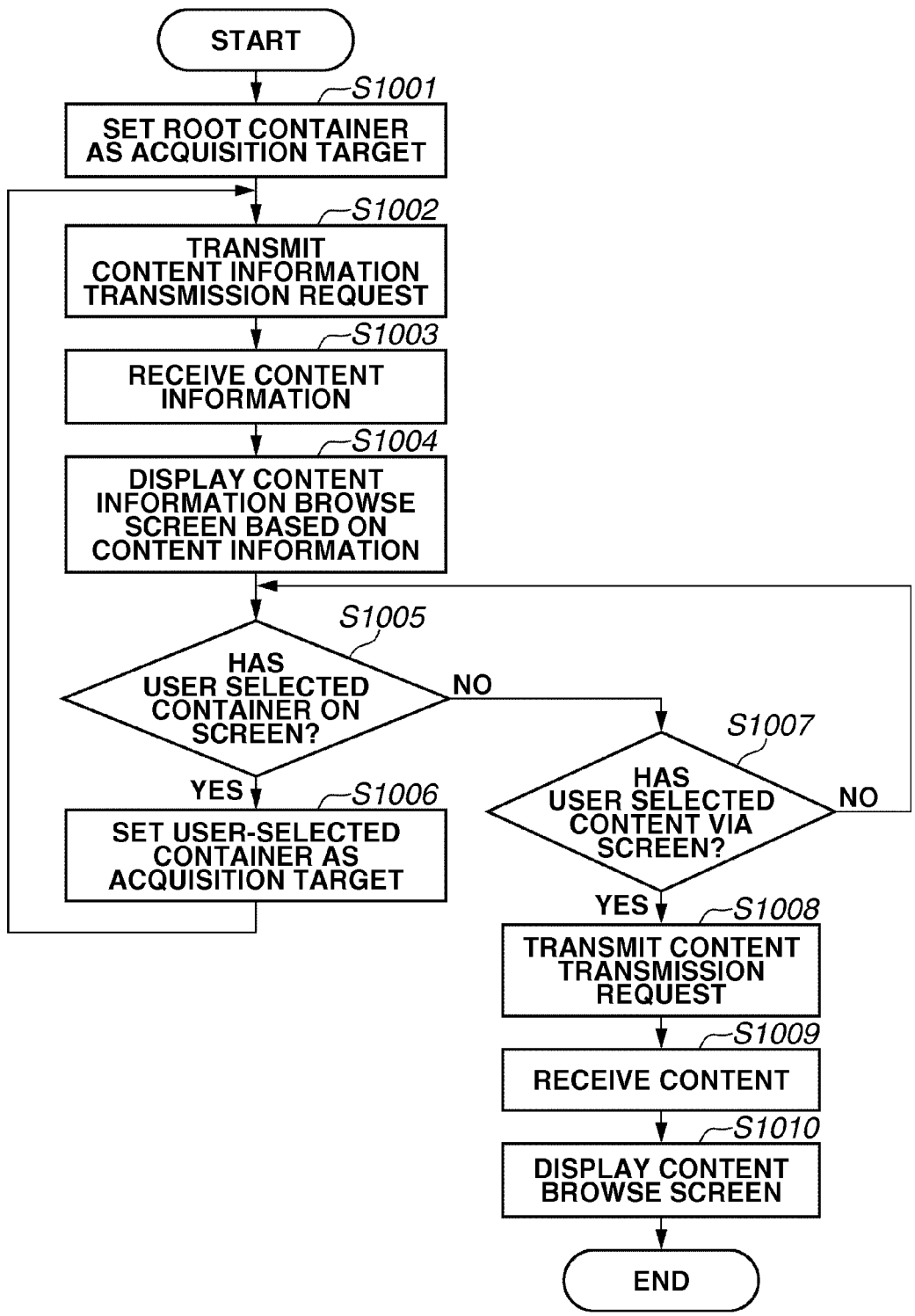
FIG. 10 is a flow chart illustrating an exemplary flow of an operation executed by a receiving apparatus for displaying a content information browse image.

FIG. 10 is a flow chart illustrating an exemplary flow of an operation for acquiring the content information from the transmission apparatus 20, which is executed by the receiving apparatus 30, and an operation for displaying an icon for referring to the content included in the container whose content information has been acquired and/or an icon for the sub container.

A program of the processing in the flow chart of FIG. 10 is stored on the ROM 302 of the receiving apparatus 30 and is executed by the CPU 301. However, alternatively, the processing illustrated in FIG. 10 may be implemented by hardware.

Referring to FIG. 10, in operation S1001, the receiving apparatus 30 receives a content information browse request, which has been input by the user. In the present exemplary embodiment, a content information browse request refers to a request for the receiving apparatus 30 to receive content information from the transmission apparatus 20 and for the display unit 50 to display the icon for referring to the content included in the container and/or the icon for the sub directory (sub container) included in the container.

After receiving the content information browse request, the receiving apparatus 30 designates the root container as the target of the first designation of the container in the transmission apparatus 20. More specifically, because an object ID of the root container in the CDS has been fixedly set at "0", the receiving apparatus 30 sets the object ID of the designation target container at "0".

In operation S1002, the receiving apparatus 30 transmits a request for transmitting the content information included in the container to be designated to the transmission apparatus 20. More specifically, the receiving apparatus 30 transmits a Browse action of the CDS to the transmission apparatus 20.

In operation S1003, the receiving apparatus 30 acquires the identification information for referring to the content included in the designated container and/or to the sub container included in the designated container from the transmission apparatus 20 as a reply to the container designation.

In operation S1004, the receiving apparatus 30 generates a content information browse image according to the acquired content information. The content information browse image refers to an image or an icon for browsing the content (or the container) included in the designated container. The content information browse image will be described in detail below with reference to FIGS. 11 and 12. In addition, in operation S1004, the receiving apparatus 30 displays the generated content information browse image on the display unit 50.

In operation S1005, the receiving apparatus 30 determines whether the user has selected a container from the content information browse image displayed on the display unit 50. In determining whether the user has selected the image corresponding to the container, the receiving apparatus 30 may execute the determination according to whether a mouse cursor has been placed on the icon for the container displayed on a display screen and whether the user has clicked the icon. However, the method for determining whether the user has selected a container is not limited to this.

If the user has selected the container from the content information browse image (Yes in operation S1005), then the processing advances to operation S1006. On the other hand, if the user has not selected a container from the content information browse image (No in operation S1005), then the processing advances to operation S1007.

In operation S1006, the receiving apparatus 30 sets the container selected by the user as the designation target container. Then the processing returns to operation S1002. In operation S1002, the receiving apparatus 30 repeats the processing for acquiring the content information and the processing for displaying the content information browse image.

In operation S1007, the receiving apparatus 30 determines whether the user has selected a content from the content information browse image displayed on the display unit 50. If the user has selected a content from the content information browse image (Yes in operation S1007), then the processing advances to operation S1008. On the other hand, if the user has not selected a content from the content information browse image (No in operation S1007), then the processing returns to operation S1005.

In operation S1008, the receiving apparatus 30 transmits a request for transmitting the content selected by the user to the transmission apparatus 20. The content transmission request is executed according to information about a link destination, such as a uniform resource locator (URL), which is included in the identification information for referring to the designated content.

In operation S1009, the receiving apparatus 30 acquires the requested content from the transmission apparatus 20 as a reply to the content transmission request. In operation S1010, the receiving apparatus 30 reproduces the received content. The acquisition and the reproduction of the content may be executed by stream-reproduction of the content existing in the transmission apparatus 20.

Figure 11:
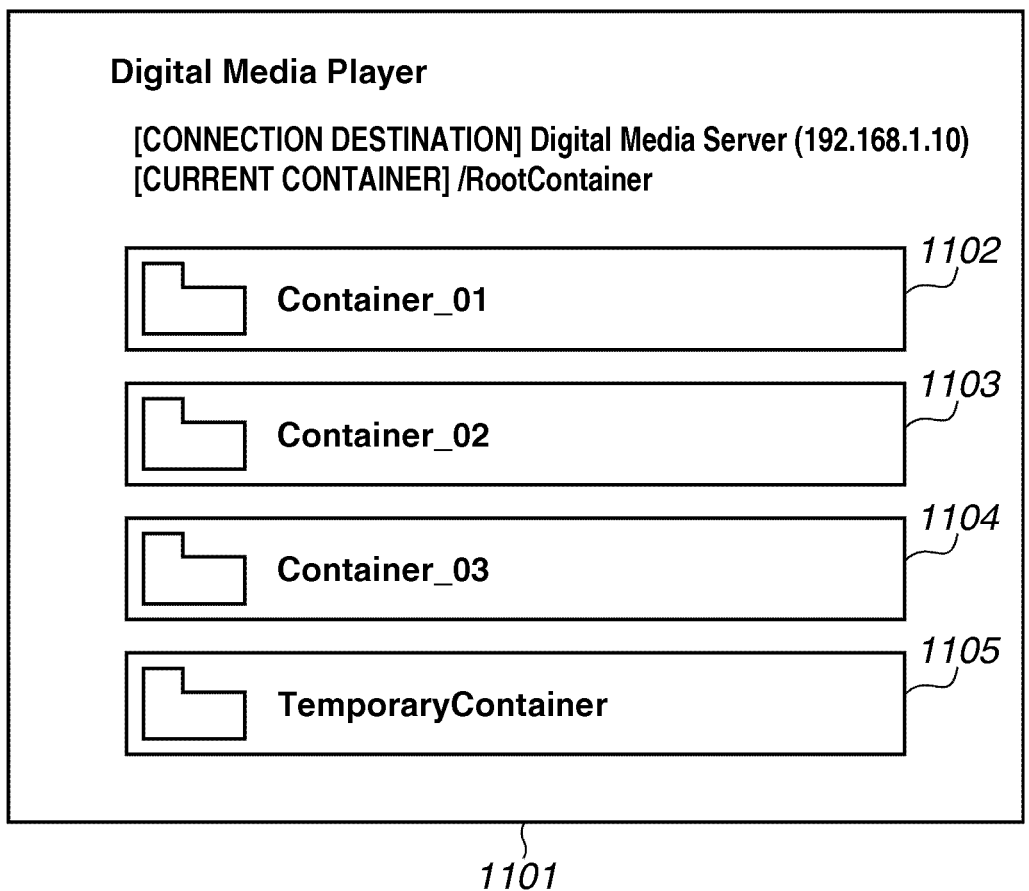
FIG. 11 illustrates an example of a content information browse image displayed by the receiving apparatus according to content information included in a designated container.

FIG. 11 illustrates an example of the content information browse image, which the receiving apparatus 30 has acquired from the transmission apparatus 20 and which has been displayed on the display unit 50 according to the content information to which the identification information for referring to the temporary container has been added. More specifically, the content information browse image illustrated in FIG. 11 is displayed according to the DIDL-Lite element 501, which indicates the information about the container included in the root container 401 and the content information included therein. The display of the content information browse image is executed by the display control unit 306.

A content information browse image 1101 indicates the entire content information browse image, which is controlled by the receiving apparatus 30 to be displayed on the display unit 50. Icons 1102 through 1104 correspond to the container elements 502 through 504, which correspond to the containers 402 through 404, respectively.

An icon 1105 corresponds to the container element 505, which corresponds to the temporary container 405. The icons 1102 through 1105 may be selected by the user via the content information browse image 1101.

In the above-described manner, the transmission apparatus 20 displays the icon for the sub container included in the container designated by the receiving apparatus 30 on the receiving apparatus 30.

The content information browse image illustrated in FIG. 11 is displayed if the receiving apparatus 30 acquires the content information from the transmission apparatus 20 during a time period from the insertion of the removable medium 40 to the transmission apparatus 20 and the removal of the removable medium 40 from the transmission apparatus 20 after the loading of the new content has started.

As described above, if the receiving apparatus 30 has designated a container while the loading control unit 214 is loading the content, the display control unit 306 displays, on the receiving apparatus 30, the icon for the temporary directory (container) for referring to the content loaded by the loading control unit 214 as the icon for the sub container included in the designated container.

By referring to the icon 1105 on the screen, which indicates the temporary container, the user of the receiving apparatus 30 is enabled to easily recognize that the new content exists. In the present exemplary embodiment, a title name "Temporary Container" is assigned to the icon 1105 according to a title attribute (dc:title attribute) of the container element, which corresponds to the temporary container 405.

The transmission apparatus 20 may change the title attribute to be added to the temporary container to a name more easily recognized or understood by the user. More specifically, if a name "list of new contents" or "list of currently loaded contents" is used, the user of the receiving apparatus 30 may more easily recognize that the new content exists.

Figure 12:
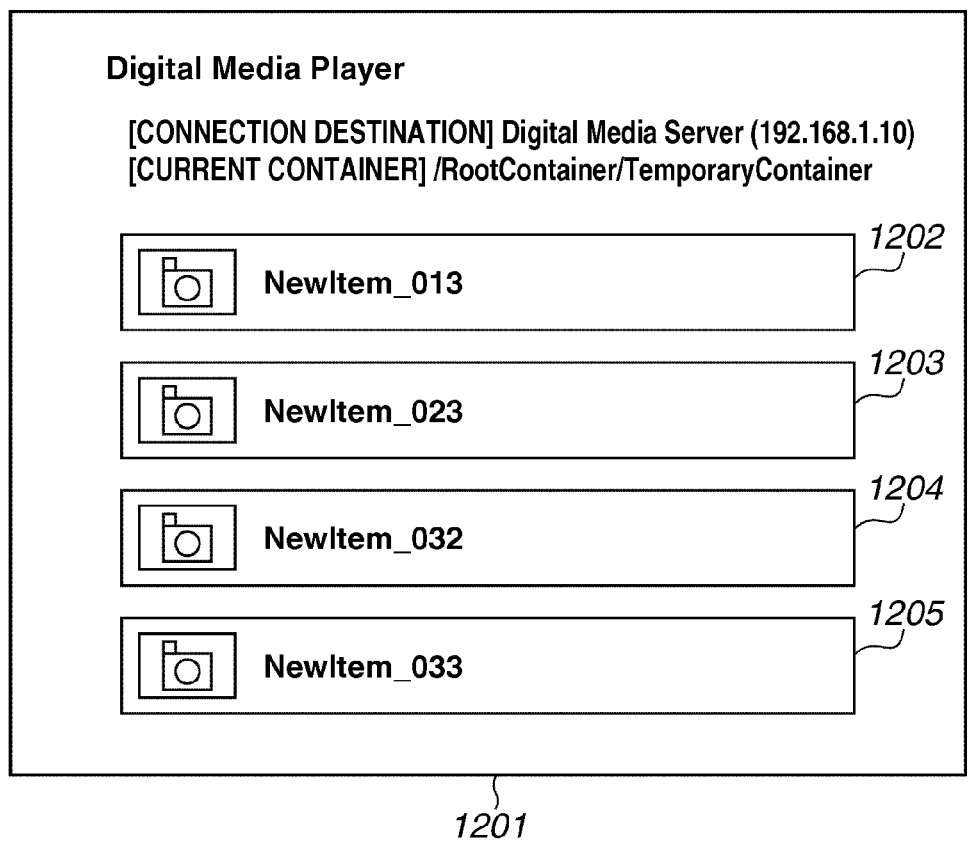
FIG. 12 illustrates an example of a content information browse image displayed by the receiving apparatus according to content information included in a temporary container.

FIG. 12 illustrates an example of the content information browse image, which the receiving apparatus 30 according to the present exemplary embodiment has acquired from the transmission apparatus 20 and which has been displayed according to the content information included in the temporary container. The content information browse image illustrated in FIG. 12 is displayed based on the DIDL-Lite element 601 described in FIG. 6, which describes the content information included in the temporary container 405.

A content information browse image 1201 indicates the entire content information browse image displayed by the receiving apparatus 30 on the display unit 50. Icons 1202 through 1205 are content icons corresponding to the item elements 602 through 605, which indicate the new contents 411 through 414 respectively.

The user may select one from among the icons 1202 through 1205 via the content information browse image 1101. FIG. 12 is displayed on the display unit 50 after the user has selected the icon 1105 in FIG. 11.

In the above-described manner, the transmission apparatus 20 displays the icon for referring to the content included in the container designated by the receiving apparatus 30 on the receiving apparatus 30.

Figure 13:
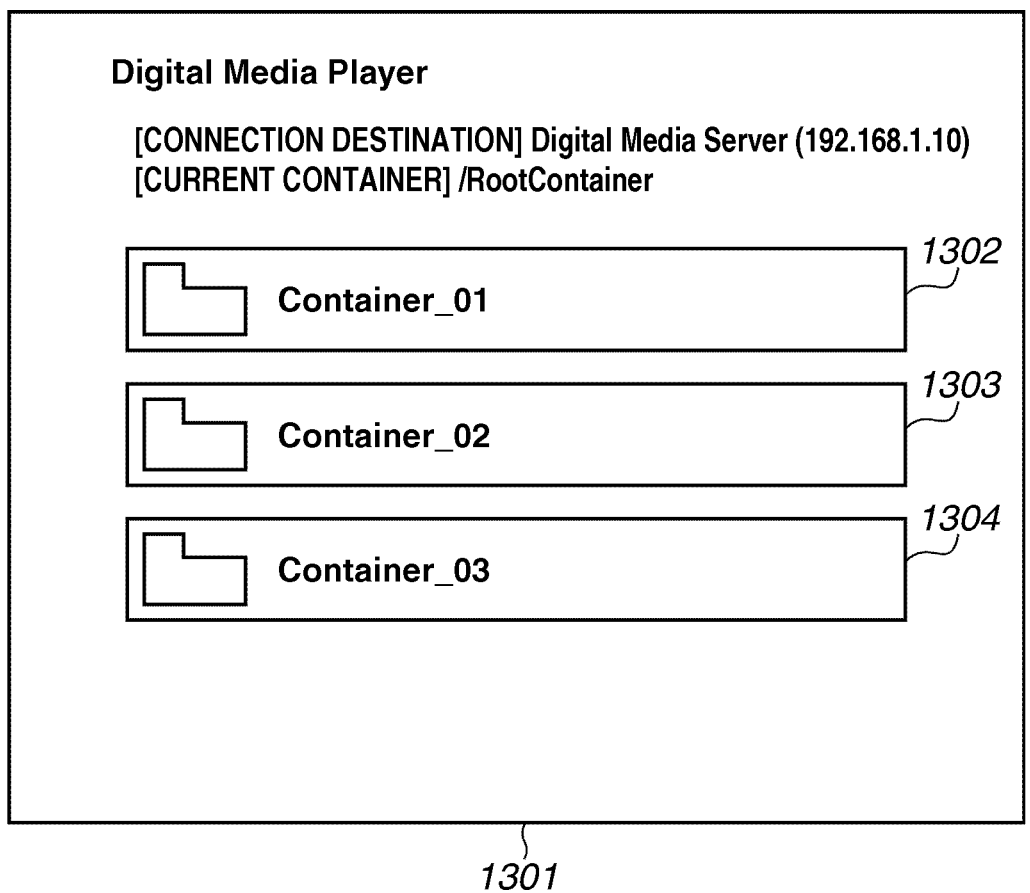
FIG. 13 illustrates an example of a content information browse image displayed by the receiving apparatus according to content information to which no identification information for referring to a temporary container has been added.

FIG. 13 illustrates an example of the content information browse image, which the receiving apparatus 30 according to the present exemplary embodiment has acquired from the transmission apparatus 20 and which has been displayed according to the content information to which no identification information for referring to the temporary container has been added.

More specifically, the content information browse image illustrated in FIG. 13 is displayed according to the DIDL-Lite element among the DIDL-Lite element 501 illustrated in FIG. 5 except the container element 505, which indicates the temporary container 405.

A content information browse image 1301 indicates the entire content information browse image displayed by the receiving apparatus 30 on the display unit 50. Icons 1302 through 1304 correspond to the container elements 502 through 504, which indicate the containers 402 through 404 respectively.

The content information browse image 1301 illustrated in FIG. 13 is displayed if the receiving apparatus 30 has acquired the content information included in the root container 401 from the transmission apparatus 20 after the receiving apparatus 30 has referred to the icon for the new content included in the temporary container 405 in FIG. 12.

In addition, the content information browse image 1301 illustrated in FIG. 13 is also displayed if the receiving apparatus 30 has acquired the content information included in the root container 401 from the transmission apparatus 20 if the removable medium 40 has been removed from the transmission apparatus 20 and when the transmission apparatus 20 has completed the new content loading processing.

Unlike the content information browse image illustrated in FIG. 11, the icon 1105, which indicates the temporary container 405, is not displayed in FIG. 13. This is because if the content included in the temporary container 405 has been already referred to or if the removable medium 40 has already been removed from the transmission apparatus 20, the information about the temporary container 405 becomes unnecessary for the user of the receiving apparatus 30.

With the above-described configuration, the present exemplary embodiment may enable the user of the receiving apparatus 30 to utilize the temporary container 405 only when it is necessary. Accordingly, the present exemplary embodiment may improve the user convenience.

As described above, the transmission apparatus 20 may transmit the content information to which the identification information for referring to the temporary container for referring to the loaded content in response to the designation of the container executed by the receiving apparatus 30. Furthermore, by using the start of the new content loading processing as a trigger, the transmission apparatus 20 adds the identification information for referring to the temporary container to the content information in response to an arbitrary container designation received after the start of the new content loading processing.

Accordingly, the user of the receiving apparatus 30 is enabled to easily recognize that the new content exists when the new content is loaded to the transmission apparatus 20 regardless of the order of the layer of the currently referred container. With the above-described configuration, the present exemplary embodiment may improve the convenience of the user of the receiving apparatus 30.

In the present exemplary embodiment, the transmission apparatus 20 does not discontinue the addition of the identification information for referring to the temporary container even if the loading of the new content from the removable medium 40 has been completed but discontinues the addition of the identification information for referring to the temporary container if the removal of the removable medium 40 from the transmission apparatus 20 is detected.

With the above-described configuration, if only a small number of the new content is to be loaded from the removable medium 40, the transmission apparatus 20 may not immediately discontinue the addition of the information about the temporary container. Accordingly, the present exemplary embodiment may increase the opportunity of the user of the receiving apparatus 30 to recognize that the new content exists. As a result, the present exemplary embodiment may improve the user convenience.

However, the timing of stopping the addition of the identification information for referring to the temporary container is not limited to a timing of removal of the removable medium 40. More specifically, the transmission apparatus 20 may stop the addition of the identification information for referring to the temporary container at a timing of completion of loading the new content from the removable medium 40.

Alternatively, the transmission apparatus 20 may add the identification information for referring to the temporary container to the identification information for the container designated by the receiving apparatus 30 even after the loading of the new content is completed.

In addition, in the present exemplary embodiment, the transmission apparatus 20 executes control not for adding the identification information for referring to the temporary container for an already referred temporary container according to a result of the determination as to whether the temporary container has been already referred to. This is because if the user of the receiving apparatus 30 has already referred to the temporary container and once the user has recognized that the new content exists, the user may not need the identification information for referring to the temporary container.

With the above-described configuration, the present exemplary embodiment prevents the transmission of unnecessary information and may improve the user convenience.

Furthermore, in the present exemplary embodiment, the insertion of the removable medium 40 is the trigger for starting the loading of a new content and for starting the addition of the identification information for referring to the temporary container. The above-described configuration may be useful if the user desires to load a photographed content to the transmission apparatus 20 after shooting a still image content or a moving image content by a digital camera or a digital video camera.

In other words, the loading of a photographed content may be implemented by merely removing a memory card storing the photographed content and inserting the memory card to the transmission apparatus 20. Accordingly, the present exemplary embodiment may improve the user operability.

Similarly, in the present exemplary embodiment, the addition of the identification information for referring to the temporary container is discontinued at a timing of completion of the loading of the new content and at a timing of removal of the removable medium 40 as a trigger. With the above-described configuration, the present exemplary embodiment may notify the transmission apparatus 20 that the new content has been completely loaded by a mere operation by the user of the transmission apparatus 20 for removing the removable medium 40 from the transmission apparatus 20. As a result, the present exemplary embodiment may improve the user operability.

In the present exemplary embodiment, at a timing of the start of the new content loading processing as a trigger, the transmission apparatus 20 adds the identification information for referring to the temporary container to an arbitrary designation of a container, which is to be received after the start of the new content loading processing. However, the present exemplary embodiment is not limited to this.

For example, alternatively, the identification information for referring to the temporary container may be added only to the container designation for a sub container and a content included in a specific container. More specifically, in the Browse action of the CDS, which is a container designation, if the metadata type parameter of the container is "BrowseDirectChildren", the identification information for referring to the temporary container may be added.

With the above-described configuration, the transmission apparatus 20 may merely add the identification information for referring to the temporary container to a specific container designation. As a result, the present exemplary embodiment may reduce the processing load on the transmission apparatus 20.

A server apparatus on a network, a device having a proximity wireless communication function, such as an IC card, or an optical disk may be used as the removable medium 40, which is the source of loading a new content from. In this case, the timing when the transmission apparatus 20 starts or discontinues the addition of the identification information for referring to the temporary container is applied according to a condition compliant with the characteristic of the apparatus or the device.

More specifically, if a server apparatus on a network is used as the removable medium 40, the transmission apparatus 20 starts the addition of the identification information for referring to the temporary container according to the timing at which the transmission apparatus 20 is connected to the server apparatus. Further, at a timing at which the transmission apparatus 20 discontinues the communication with the server apparatus, the transmission apparatus 20 discontinues the addition of the identification information for referring to the temporary container.

Furthermore, if a memory having the proximity wireless communication function is used as the removable medium 40, the transmission apparatus 20 may start the addition of the identification information for referring to the temporary container at a timing at which the transmission apparatus 20 starts the connection with the storage device by the proximity wireless communication. Then, when the transmission apparatus 20 discontinues proximity wireless communication to the storage device, the transmission apparatus 20 ends the addition of the identification information for referring to the temporary container.

Alternatively, the user of the storage device having the proximity wireless communication function may start the addition of the identification information for referring to the temporary container merely by bringing the storage device closer to the transmission apparatus 20 or by causing the storage device to contact the transmission apparatus 20. If the user separates the storage device from the transmission apparatus 20, the user may end the addition of the identification information for referring to the temporary container. With the above-described configuration, the present exemplary embodiment may improve the user operability.

Similarly, in the present exemplary embodiment, the transmission apparatus 20 discontinues the addition of the identification information for referring to the temporary container if it is detected that the removable medium 40 has been removed from the transmission apparatus 20. However, the present exemplary embodiment is not limited to this. More specifically, the transmission apparatus 20 may discontinue the addition of the identification information for referring to the temporary container immediately after the loading of the new content from the removable medium 40 is completed.

If the receiving apparatus 30 has designated a container after more than the predetermined number of contents has been loaded by the loading control unit 214 and before the completion of the content by the loading control unit 214, the information addition unit 218 adds the identification information generated by the generation unit 216 to the content information included in the designated container. With the above-described configuration, the present exemplary embodiment may constitute the transmission apparatus 20 with a simpler configuration.

In addition, in the present exemplary embodiment, the transmission apparatus 20 starts the new content loading processing and the addition of the identification information for referring to the temporary container if it is detected that the removable medium 40 has been inserted to the transmission apparatus 20. However, the present exemplary embodiment is not limited to this.

For example, after detecting that the removable medium 40 has been inserted to the transmission apparatus 20, the transmission apparatus 20 may prompt the user of the transmission apparatus 20 to instruct whether to start loading a new content. With the above-described configuration, the present exemplary embodiment may start the addition of the identification information for referring to the temporary container at a timing desired by the user of the transmission apparatus 20. Accordingly, the present exemplary embodiment having the above-described configuration may improve the user convenience.

In the present exemplary embodiment, the new content loaded from the removable medium 40 may be referred to from the temporary container. However, the present exemplary embodiment is not limited to this.

More specifically, if a very large number of new contents have been loaded, the transmission apparatus 20 may classify and store the new contents into a plurality of sub temporary containers. Furthermore, the transmission apparatus 20 may cause the plurality of sub temporary containers to be included in a temporary container. Furthermore, the transmission apparatus 20 causes identification information for referring to the plurality of sub temporary containers to be included in the content information in the temporary container. Moreover, the transmission apparatus 20 transmits the temporary container content information to the receiving apparatus 30.

The sub temporary containers may be generated for each category, such as the date and time, the type of the image (still image or moving image), the genre of the content, or the owner of the content, according to attribute information about the loaded new content.

With the above-described configuration, the present exemplary embodiment enables the user of the receiving apparatus 30 to select a sub temporary container when the user refers to the temporary container. As a result, the present exemplary embodiment having the above-described configuration may improve the user convenience because the user is enabled to easily search for a desired new content.

Other Embodiments

Aspects of various exemplary embodiments may also be realized by a computer of a system or apparatus, or devices such as a central processing unit (CPU) or main processor unit/microprocessor unit (MPU) that reads out and executes a program or instructions recorded/stored on a memory device to perform the functions of the above-described embodiments, and by a method, the operations of which are performed by a computer of a system or apparatus by, for example, reading out and executing a program recorded on a memory device or a non-transitory storage medium to perform operations or functions of the above-described embodiments. The method may be a computerized method to perform the operations with the use of a computer, a processor, or a programmable device. The operations in the method involve physical objects or entities (e.g., a content, directory) representing a machine or a particular apparatus (e.g., receiving apparatus, transmission apparatus, network). In addition, the operations in the method transform the elements or parts in the transmission/receiving apparatus from one state to another state. For example, a content information is transformed (e.g., added with identification information, transmitted) into a new state of having identification information and being transmitted to a receiving apparatus. For this purpose, the program/instructions is/are provided to the computer for example via a network or from a recording medium of various types serving as the memory device (e.g., computer-readable medium). In such a case, the system or apparatus, and the recording medium where the program/instructions is/are stored, are included as being within the scope of various embodiments of the present invention.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-174356 filed Aug. 3, 2010, which is hereby incorporated by reference herein in its entirety.

What is claimed is:

1. A transmission apparatus comprising:
a loading unit configured to load a first content;
a storage unit configured to store a second content in a directory of a storage area on the storage unit;
a generation unit configured to generate identification information used to designate a virtual directory for referring to the content loaded by the loading unit so that the virtual directory is referred to as a sub directory included in the directory designated by a receiving apparatus and the content loaded by the loading unit is referred to if the virtual directory is designated by the receiving apparatus; and a transmission unit configured to transmit to the receiving apparatus the generated identification information to be used by the receiving apparatus to designate the virtual directory.

2. The transmission apparatus according to claim 1, further comprising:
an addition unit configured, after the loading unit has loaded the first content and if the directory has been designated by the receiving apparatus, to add the generated identification information to information that is to be transmitted by the transmission unit and is to be used to designate a sub directory or a content included in the directory being designated by the receiving apparatus;
wherein the addition unit is configured, if the receiving apparatus has designated a directory while the loading unit is loading the content, to add the identification information generated by the generation unit to content information included in the designated directory.

3. The transmission apparatus according to claim 1, further comprising:
an addition unit configured, after the loading unit has loaded the first content and if the directory has been designated by the receiving apparatus, to add the generated identification information to information that is to be transmitted by the transmission unit and is to be used to designate a subdirectory or a content included in the directory being designated by the receiving apparatus;
wherein the addition unit is configured, if the receiving apparatus has designated a directory after a timing at which the loading unit has loaded more than a predetermined number of contents and before a timing at which the loading unit has completed the loading of the contents, to add the identification information generated by the generation unit to content information included in the designated directory.

4. The transmission apparatus according to claim 1, further comprising:
an addition unit configured, after the loading unit has loaded the first content and if the directory has been designated by the receiving apparatus, to add the generated identification information to information that is to be transmitted by the transmission unit and is to be used to designate a subdirectory or a content included in the directory being designated by the receiving apparatus;
wherein the addition unit is configured, if the receiving apparatus has designated a directory other than a temporary directory after a timing at which the loading unit has loaded more than a predetermined number of contents and before a timing at which the temporary directory is referred to, to add the identification information generated by the generation unit to the information about the content included in the directory other than the temporary directory.

5. The transmission apparatus according to claim 1, further comprising a connection unit configured to connect a removable medium thereto; and
an addition unit configured, after the loading unit has loaded the first content and if the directory has been designated by the receiving apparatus, to add the generated identification information to information that is to be transmitted by the transmission unit and is to be used to designate a subdirectory or a content included in the directory being designated by the receiving apparatus;
wherein
the loading unit is configured to load the content from the removable medium connected to the connection unit, and wherein the addition unit is configured, if the receiving apparatus has designated a directory after a timing at which the loading unit has loaded more than a predetermined number of contents and before a timing at which the removable medium is removed from the connection unit, to add the identification information generated by the generation unit to content information included in the designated directory.

6. A transmission apparatus comprising:
a loading unit configured to load a first content;
a storage unit configured to store a second content in a directory of a storage area on the storage unit; and
a transmission unit configured, if a receiving apparatus has designated the directory of the storage area on the storage unit after the loading unit has loaded the first content, to transmit content information for displaying an icon for a new directory for referring to the loaded first content on the receiving apparatus to the receiving apparatus as the icon for a sub directory included in the designated directory.

7. A transmission system comprising a transmission apparatus and a receiving apparatus,
wherein the transmission apparatus comprises:
a loading unit configured to load a content;
a storage unit configured to store a content in a directory of a storage area on the storage unit; and
a generation unit configured to generate identification information for referring to a new directory for referring to the content loaded by the loading unit so that the new directory is referred to as a sub directory included in a directory designated by a receiving apparatus;
an addition unit configured, after the loading unit has loaded the content and if the directory has been designated by the receiving apparatus, to add the identification information generated by the generation unit to content information included in the designated directory of the storage area on the storage unit; and
a transmission unit configured to transmit via a network the content information to which the identification information generated by the generation unit has been added by the addition unit to the receiving apparatus, and wherein the receiving apparatus comprises:
a designation unit configured to designate a directory including the content stored on the transmission apparatus;
a receiving unit configured to receive the content information from the transmission apparatus via the network; and
a display unit configured to display an icon for referring to the content included in the directory designated by the designation unit and/or an icon for a sub directory included in the designated directory according to the identification information included in the content information received by the receiving unit.

8. A transmission method comprising:
loading a content by a loading unit;
storing a content in a directory of a storage area on a storage unit;
generating, by a generation unit, identification information for referring to a new directory so that the generation unit refers to the new directory for referring to the content loaded by the loading unit as a sub directory included in a directory designated by a receiving apparatus;
adding, by an addition unit, after the loading unit has loaded the content and if the directory has been designated by the receiving apparatus, the generated identification information generated by the generation unit to content information included in the designated directory of the storage area on the storage unit; and transmitting, by a transmitting unit, the content information, to which the identification information generated by generation unit has been added by the addition unit, to the receiving apparatus.

9. A transmission method by a transmission apparatus comprising:

storing a content in a directory of a storage area on a storage unit;

transmitting by a transmission unit of the transmission apparatus via a network, after a loading unit of the transmission apparatus has loaded a content and if a receiving apparatus has designated a directory of the storage area on the storage unit, content information for displaying an icon for a new directory for referring to the content on the receiving apparatus to the receiving apparatus as the icon for a sub directory included in the designated directory.

10. A computer-readable non-transitory storage medium having instructions which, when executed by a processor, cause the processor to perform operations comprising:

loading a content;

storing a content in a directory of a storage area on a storage unit;

generating identification information for referring to a new directory for referring to the loaded content so that the new directory for referring to the loaded content is referred to as a sub directory included in a directory designated by a receiving apparatus;

adding, after the content has been loaded and if the directory has been designated by the receiving apparatus, the generated identification information to content information included in the designated directory of the storage area on the storage unit; and transmitting the content information, to which the generated identification information has been added, to the receiving apparatus via a network.

11. A computer-readable non-transitory storage medium storing instructions which, when executed by a processor, cause the processor to perform operations comprising:

loading a content; and storing a content in a directory of a storage area on a storage unit;

transmitting, if a directory of the storage area on the storage unit has been designated by a receiving apparatus while the content is being loaded, content information for displaying an icon for a new directory for referring to the loaded content on the receiving apparatus to the receiving apparatus as an icon for a sub directory included in the designated directory via a network.

12. The transmission apparatus according to claim 1, wherein the generation unit generates the identification information such that the virtual directory is referred to as the sub directory of the designated directory if the loaded content is stored in a directory different from the designated directory of the storage area on the storage unit.

13. The transmission method according to claim 8, wherein the generation unit generates the identification information such that the virtual directory is referred to as the sub directory of the designated directory if the loaded content is stored in a directory different from the designated directory of the storage area on the storage unit.

14. The medium according to claim 10, wherein generating, by a generation unit the identification information such that the virtual directory is referred to as the sub directory of the designated directory if the loaded content is stored in a directory different from the designated directory of the storage area on the storage unit.

* * * * *